Aug. 3, 1965  A. M. BRENNEKE  3,198,531

PISTON RING

Filed Jan. 19, 1962  2 Sheets-Sheet 1

INVENTOR.
Arthur M. Brenneke,
BY
Davis, Lindsey, Hibben & Noyes
Atty's.

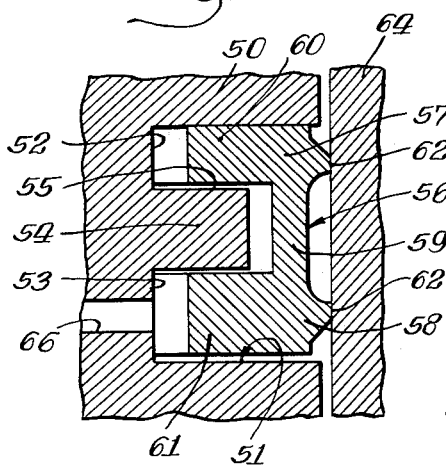
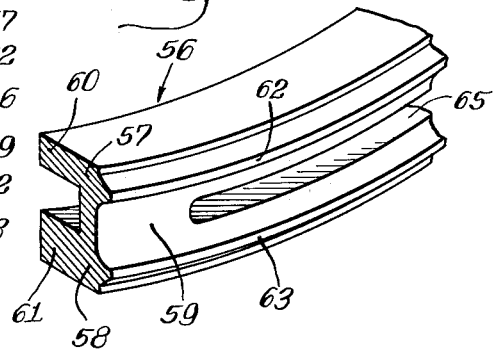
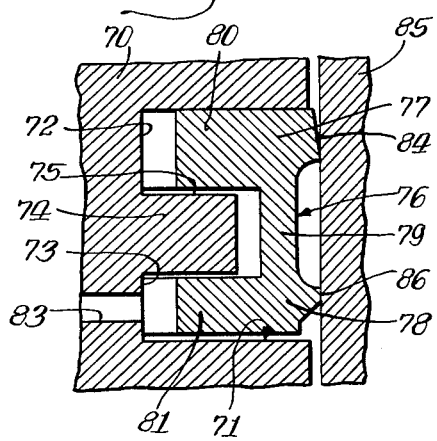
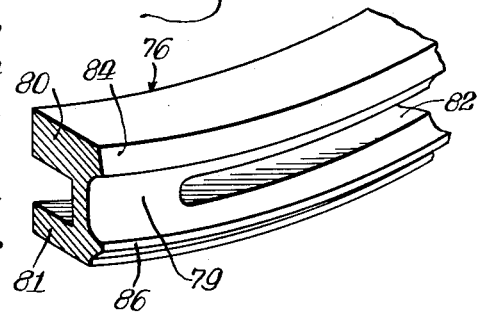

United States Patent Office 3,198,531
Patented Aug. 3, 1965

3,198,531
PISTON RING
Arthur M. Brenneke, Hagerstown, Ind., assignor, by mesne assignments, to Perfect Circle Corporation, Hagerstown, Ind., a corporation of Indiana
Filed Jan. 19, 1962, Ser. No. 167,283
2 Claims. (Cl. 277—178)

The invention relates to a piston and ring construction for an internal combustion engine.

The general object of the invention is to provide a novel piston and ring construction of such axial dimension that the piston may be shorter axially than a piston of the type heretofore normally employed, and correspondingly, the engine block may be shorter axially of the cylinders.

More specifically, it is an object to provide a novel combined compression and oil ring adapted to be mounted in a single groove in a piston.

Another object is to provide a novel piston ring having a compression ring portion and an oil ring portion, with the two portions cooperating with each other in performing their respective functions.

A further object is to provide a novel piston ring having compression ring and oil ring portions integral with each other, the compression ring portion being adapted to seal against surfaces of the groove.

Still another object is to provide a novel piston ring having compression ring and oil ring portions integral wtih each other, each portion having a cylinder engaging face, the ring being constructed so that the faces exert the desired pressure on the cylinder wall without the use of a separate spring member.

Other objects and advantages will become apparent from the following description taken in conjunction with the accompanying figures of the drawings, in which:

FIG. 6 is a sectional view, similar to FIG. 2 but showing another modified form of ring;

FIG. 7 is a fragmentary perspective view of the ring shown in FIG. 6;

FIG. 8 is a sectional view, similar to FIG. 2, but showing still another modified form of ring; and FIG. 9 is a fragmentary perspective view of the ring shown in FIG. 8.

Figure 1:
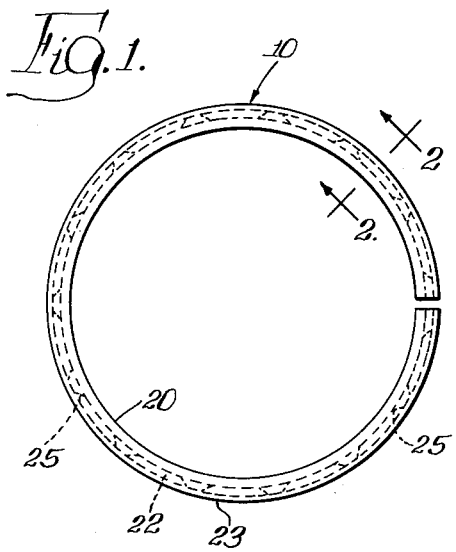
FIG. 1 is an axial view of a combined compression and oil ring embodying the features of the invention.

In many present day internal combustion engines used for automotive purposes, as well as engines for other purposes, each piston may be provided with two compression rings, and an oil ring, each mounted in its own groove in the piston. A predetermined portion of the length of the piston is therefore required for such rings, since to the sum of the groove widths must be added the widths of the lands between the grooves and the land above the upper groove. The length of the cylinders, and hence the height of the engine, is of course dependent upon the length of the pistons. Present day vehicles are designed to be as low as possible, and it is therefore desirable to reduce the height of the engine. It is also desirable to reduce such height in order to reduce the weight of the engine, as well as to provide more space under the hood of the vehicle for auxiliary equipment.

The present invention involves a combined compression and oil ring mounted in a single groove in the piston. Thus, the land, heretofore required between the oil ring and the lower compression ring, is eliminated so that the length of the piston may thereby be reduced. Consequently the overall height of the engine may be reduced.

A combined compression and oil ring embodying the features of the invention comprises a compression ring portion and an oil ring portion, the two portions being integral with each other. A piston adapted to receive the ring has an annular groove formed therein, the bottom of the groove having an inwardly extending annular upper channel at the upper side of the groove and an inwardly extending annular lower channel at the lower side of the groove. A rib is thus formed between the two channels, the rib providing an upwardly facing ledge having a radially extending surface. The compression ring portion of the ring includes a radial projection extending inwardly into the upper channel, and the oil ring portion has a radial projection extending inwardly into the the lower channel. The projection of the compression ring portion makes sealing engagement with either the upper side of the groove or with the radial surface of the upwardly facing ledge on reciprocating movement of the piston, while the projection of the oil ring portion is dimensioned to remain out of contact with both the lower side of the groove and the under surface of the rib on such movement.

In one form of the piston and ring, the upper channel of the piston ring groove has greater axial width than the lower channel and the projection of the compression ring portion of the ring has greater axial thickness than the projection of the oil ring portion. In another form, the upper channel has less axial width than the lower channel and the projection of the compression ring portion has less axial thickness than the projection of the oil ring portion. In still another form, the upper and lower channels have substantially the same axial width and the projection of the compression ring portion has slightly greater axial thickness than the projection of the oil ring portion. In all three forms, the projection on the oil ring portion is of course dimensioned to remain out of contact with the under surface of the rib and the lower side of the groove.

Both the compression ring portion and the oil ring portion are formed with cylinder engaging faces, the two faces being axially spaced. While numerous different facial configurations may be employed, it is preferred that the face of the compression ring portion be either tapered or axially extending and the face of the oil ring portion be axially extending. The ring is preferably formed with a plurality of radial slots for conducting oil scraped from the cylinder wall by the cylinder engaging faces of the ring to the inner portion of the piston ring groove. The piston preferably has apertures extending from the inner side of the lower channel inwardly to the interior of the piston for draining oil from the groove.

Figure 2:
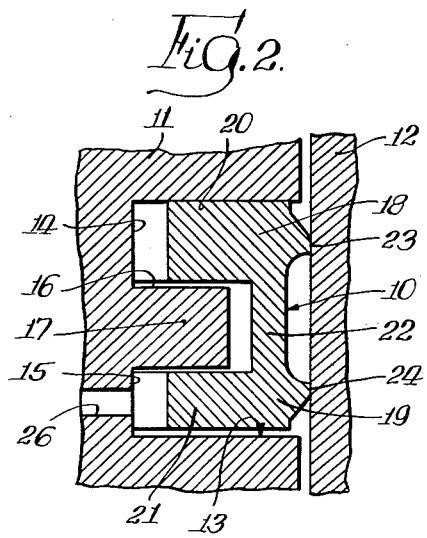
FIG. 2 is an enlarged radial sectional view of the ring shown in FIG. 1, taken on the line 2—2 of FIG. 1 and illustrating the ring mounted in a groove in a piston.
Figure 3:
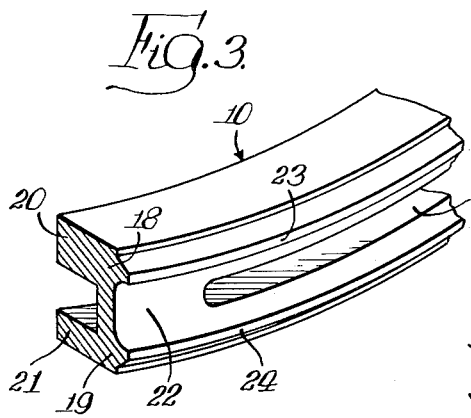
FIG. 3 is a fragmentary perspective view of the ring shown in FIGS. 1 and 2.

In greater detail, FIGS. 1 to 3 show one embodiment of the invention, and in FIG. 2 the ring is shown mounted in a groove in a piston and the latter is mounted in a cylinder. The ring is indicated generally by the numeral 10, the piston is fragmentarily shown at 11, and the cylinder is fragmentarily shown at 12. The piston 11 is provided with an annular groove indicated generally at 13. The groove 13 in its bottom has an inwardly extending annular upper channel 14 at its upper side and an inwardly extending annular lower channel 15 at its lower side. The two channels 14 and 15 thus form an annular rib 17 projecting outwardly in the groove 13, the upper side of the rib constituting an upwardly facing ledge 16 having a radially extending surface.

The ring 10 comprises a compression ring portion 18 and an oil ring portion 19. The compression and oil ring portions are axially spaced and are connected by a center portion 22 that is spaced from the wall of the cylinder 12, the three portions 18, 19 and 22 being formed integrally. The compression ring portion 18 has a projection 20 that extends radially inward into the upper channel 14 and overlies the ledge 16, and the oil ring portion 19 has a projection 21 that extends radially inward into the lower channel 15. In the form of the invention shown in FIGS. 1 to 3, the compression ring portion 20 has an axially extending cylinder engaging face 23 and the oil ring portion 21 has a similar axially extending cylinder engaging face 24.

For the purpose of carrying away oil scraped from the wall of the cylinder 12 by the cylinder engaging faces of the ring, the ring is provided with a plurality of radial slots 25, FIGS. 1 and 3, formed in the center portion 22. These slots 25 carry the oil to the interior of the groove 13 in the piston 11. To drain the oil from the groove 13, drain holes 26 may be provided in the piston, in this instance extending from the lower channel 15 to the interior of the piston 11.

The projection 20 of the compression ring portion 18 of the ring 10 has greater axial thickness than the projection 21 of the oil ring portion 19, and the upper channel 14 of the piston 11 has greater axial width than the lower channel 15. The upper side of the compression ring portion 18 of the ring 10 moves into sealing engagement with the upper side of the groove 13 during certain portions of the engine cycle, and the under surface of the projection 20 of the compression ring portion 18 moves into sealing engagement with the ledge 16 during other portions of the engine cycle, on reciprocating movement of the piston 11. The projection 21 of the oil ring portion 19 is positioned in the lower channel 15 of the groove 13 and is dimensioned so that it does not contact either the lower side of the groove 13 or the under surface of the rib 17 on movement of the piston 11.

The ring with its projections 20 and 21 is sufficiently resilient to hold the faces 23 and 24 against the wall of the cylinder 12 without the use of a separate biasing member such as a spring. Further, the unsymmetrical form of the channels 14 and 15 and the projections 20 and 21 insures proper installation since, if the ring were upside down, the projection 20 could not be placed in the lower channel 15. The ring has a still further important advantage in that the size of the projection 21 of the oil ring portion 19 does not have to be held to close tolerances. Sufficient clearance may be allowed between the projection 21 and the lower side of the groove 13 and the rib 17 so that it cannot interfere with the sealing engagement between the projection 20 of the compression ring portion 18 and the upper side of the groove 13 and the ledge 16 even though the thickness of the projection 21 may vary slightly.

Figure 4:
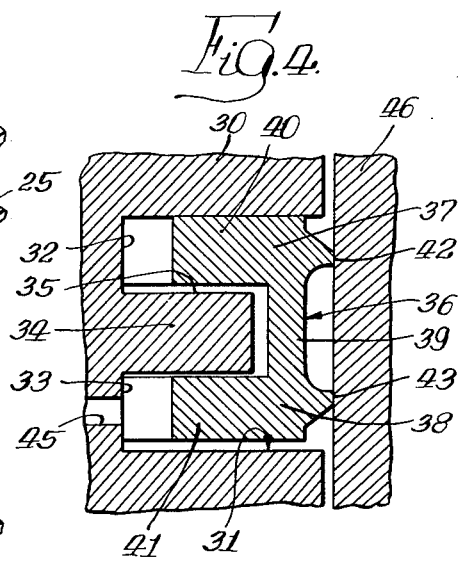
FIG. 4 is a sectional view, similar to FIG. 2 but showing a modified form of ring.
Figure 5:
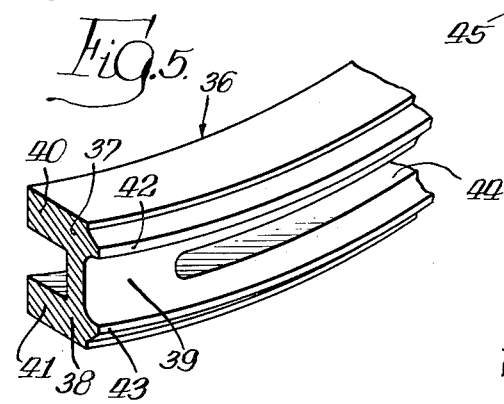
FIG. 5 is a fragmentary perspective view of the ring shown in FIG. 4.

In the form of the piston and ring shown in FIGS. 4 and 5, the two channels of the piston ring groove have substantially the same width, and the projection of the compression ring portion has slightly greater thickness than the projection of the oil ring portion. The piston, indicated generally by the numeral 30, has an annular groove 31 provided in its bottom with an annular upper channel 32 at the upper side of the groove 31, and an annular lower channel 33 at the lower side of the groove 31, both channels 32 and 33 extending radially inward and having substantially the same width. An annular rib 34 is formed between the two channels 32 and 33, the upper surface of the rib 34 forming a ledge 35 having a radially extending surface.

The piston ring, indicated generally by the numeral 36, has a compression ring portion 37, an oil ring portion 38, and a center portion 39, the three portions 37 and 39 being integrally formed. A radial projection 40 is formed on the compression ring portion 37 which extends into the upper channel 32 and overlies the ledge 35, and a radial projection 41 is formed on the oil ring portion 38, which extends into the lower channel 33. The compression ring portion 37 and the oil ring portion 38 are respectively provided with cylinder 46 engaging faces 42 and 43. The center portion 39 of the ring may again be provided with radial slots 44 and the piston 30 may be provided with apertures 45 for the purpose of draining oil scraped off the cylinder wall by the cylinder engaging faces of the ring.

The upper and lower channels 32 and 33 have substantially the same axial width, and the thickness of the projection 40 of the compression ring portion 37 has only slightly greater thickness than the projection 41 of the oil ring portion 38. The projection 40 of the compression ring portion 37 makes sealing engagement with either the upper side of the groove 31 or the ledge 35 on the reciprocating movement of the piston 30, and the projection 41 is positioned in the lower channel 33 and dimensioned so that it does not contact either the lower side of the groove 31 or the undersurface of the rib 34.

While the two cylinder engaging faces 42 and 43 of compression and oil ring portions 37 and 38 are shown as being axially extending, it is apparent that other configurations may be employed. The ring 36 shown in FIGS. 4 and 5 also has the advantage that the two faces 42 and 43 exert substantially equal pressure against the cylinder wall without the use of springs.

The form of the piston and ring shown in FIGS. 6 and 7 is substantially the same as that shown in FIGS. 2 and 3 except the upper channel has less axial width than the lower channel and the projection of the compression ring portion has less thickness than the projection of the oil ring portion. The piston, indicated generally by the numeral 50, is formed with an annular groove 51 having in its bottom an annular inwardly extending upper channel 52 at the upper side of the groove, and an annular inwardly extending lower channel 53 at the lower side of the groove. A rib 54 having a radially extending upper ledge 55 is thus formed between the two channels 52 and 53.

The ring, indicated generally at 56, has a compression ring portion 57, an oil ring portion 58, and a center portion 59, the three portions 57 and 59 being formed integrally. The compression ring portion 57 has a radial projection 60 that extends into the upper channel 52 and overlies the ledge 55, and the oil ring portion 58 has a radial projection 61 that extends into the lower channel 53. The compression and oil ring portions 57 and 58 are formed with faces 62 and 63, respectively, that engage the wall of a cylinder 64. The center portion 59 of the ring 56 may again have slots 65, and the piston 50 may have apertures 66 for the purpose of draining oil scraped off the cylinder wall by the cylinder engaging faces.

From FIG. 6 it is apparent that the upper channel 52 has less axial width than the lower channel 53, and that the projection 60 of the compression ring portion 57 has less axial thickness than the projection 61 of the oil ring portion 58. The upper surface of the compression ring portion 57 moves into sealing engagement with the upper side of the groove 51 during certain portions of the engine cycle and the projection 60 of the compression ring portion 57 moves into sealing engagement with the ledge 55 during other portions of the engine cycle, on reciprocating movement of the piston 50. The projection 61 of the oil ring portion 58 is so dimensioned that it does not contact the lower side of the groove 51 or the upper surface of the rib 54 on movement of the piston.

The ring and piston shown in FIGS. 6 and 7 also has the advantages that the faces 62 and 63 exert substantially equal pressure on the cylinder wall without the use of springs, and the unsymmetrical construction ensures correct installation.

The form of the piston and ring shown in FIGS. 8 and 9 may be identical to the piston and ring shown in FIGS. 2 and 3 except that a different type of cylinder engaging face is shown. The piston, indicated generally at 70, has a groove 71 provided in its bottom with upper and lower channels 72 and 73, respectively. A rib 74 having an upwardly facing radial ledge 75 is formed between the two channels.

The piston, indicated generally at 76, has a compression ring portion 77, an oil ring portion 78, and a center portion 79, the three portions being formed integrally. A projection 80 formed on the compression ring portion 77 extends into the upper channel 72, and a projection 81 formed on the oil ring portion 78 extends into the lower channel 73. The ring 76 may be formed with a plurality of radial slots 82 and the piston may be formed with a plurality of apertures 83 for the purpose of draining oil as previously explained.

The compression ring portion 77 has a face 84 that engages the wall of a cylinder 85 and the oil ring portion 78 has a face 86 that also engages the wall of the cylinder 85. The face 84 tapers from its lower portion away from the wall of the cylinder 85, while the face 86 extends axially. It should be understood that, in all embodiments of the invention, the cylinder engaging face of the compression ring portion may be made axially extending, tapered, or any other conventional configuration desired, while the oil ring portion may have a cylinder engaging face as shown or with other conventional configuration.

From the foregoing description, it will be apparent that by providing a combined compression and oil ring mounted in a single groove in the piston, the latter may be shorter axially than the pistons heretofore normally used, and consequently the entire engine may be shorter axially of the cylinders. The respective portions of the ring properly perform their functions of sealing against loss of compression and controlling the oil in the cylinder and cooperate with each other in performing such functions. Further, the cylinder engaging faces of both portions of the ring exert substantially equal pressure against the cylinder without the use of a spring and the ring has a cross-sectional shape which provides sufficient tension when the ring is compressed within the cylinder.

I claim:

1. The combination of a piston having an annular piston ring groove, an inwardly extending annular upper channel formed in the bottom of said groove at the upper side thereof and providing an upwardly facing ledge, an inwardly extending annular lower channel formed in the bottom of said groove at the lower side thereof, and a combined compression and oil ring mounted in said groove and comprising a compression ring portion and an oil ring portion integral with each other, the compression ring portion including a projection which extends into said upper channel and said oil ring portion including a projection which extends into said lower channel, said portions respectively having cylinder engaging faces and said faces of said portions being axially spaced from each other, the axial thickness of said compression ring portion being greater than the axial width of said lower channel, whereby said ring is prevented from being inserted in said groove upside-down.

2. The combination of a piston having an annular piston ring groove, an inwardly extending annular upper channel formed in the bottom of said groove at the upper side thereof and providing an upwardly facing ledge, an inwardly extending annular lower channel formed in the bottom of said groove at the lower side thereof, and a combined compression and oil ring mounted in said groove and being of smaller axial dimension than said groove, said ring comprising a compression ring portion and an oil ring portion integral with each other, said compression ring portion including a projection which extends radially inward into said upper channel and said oil ring portion including a projection which extends radially inward into said lower channel said portions having cylinder engaging faces and said faces being axially spaced from each other, and the axial width of one of said projections being greater than the axial width of the channel for the other of said projections, whereby said ring is prevented from being inserted in said groove upside down, and said projection of said compression ring portion making sealing engagement with said upper side of the groove and said upwardly facing ledge during reciprocating movement of said piston.

References Cited by the Examiner

UNITED STATES PATENTS

| | | | |
|---|---|---|---|
| 2,048,416 | 7/36 | Tucker | 277—178 |
| 2,566,603 | 9/51 | Dykes | 277—177 |
| 2,951,732 | 9/60 | Brenneke | 277—79 |

LEWIS J. LENNY, *Primary Examiner.*

SAMUEL ROTHBERG, EDWARD V. BENHAM,
*Examiners.*